(12) United States Patent
Takeuchi

(10) Patent No.: US 8,792,048 B2
(45) Date of Patent: Jul. 29, 2014

(54) FOCUS DETECTION DEVICE AND IMAGE CAPTURING APPARATUS PROVIDED WITH THE SAME

(75) Inventor: Kengo Takeuchi, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 26 days.

(21) Appl. No.: 13/330,139

(22) Filed: Dec. 19, 2011

(65) Prior Publication Data

US 2012/0162499 A1 Jun. 28, 2012

(30) Foreign Application Priority Data

Dec. 27, 2010 (JP) ................................ 2010-291127

(51) Int. Cl.
*H04N 5/232* (2006.01)
*G03B 13/00* (2006.01)
*G03B 13/20* (2006.01)
*G03B 13/34* (2006.01)
*G01C 3/00* (2006.01)
*G03B 17/00* (2006.01)

(52) U.S. Cl.
USPC ............... 348/350; 348/345; 396/79; 396/80; 396/104; 396/121; 396/123; 396/138; 396/139; 396/140

(58) Field of Classification Search
USPC .................. 348/350, 348, 345; 396/138–143, 396/79–83, 103, 104, 107, 121–124, 89, 396/111, 114, 125, 128
See application file for complete search history.

(56) References Cited

U.S. PATENT DOCUMENTS

| 5,051,767 | A * | 9/1991 | Honma et al. ................... 396/80 |
| 6,577,344 | B2 * | 6/2003 | Kadohara et al. ............. 348/350 |
| 7,079,188 | B2 * | 7/2006 | Shiraishi et al. .............. 348/350 |
| 7,405,762 | B2 * | 7/2008 | Nonaka et al. ................ 348/348 |
| 2002/0006279 | A1 * | 1/2002 | Ide ..................................... 396/79 |
| 2003/0117515 | A1 * | 6/2003 | Yoshida et al. ............... 348/347 |
| 2008/0024647 | A1 * | 1/2008 | Ishikawa ....................... 348/345 |
| 2010/0110178 | A1 * | 5/2010 | Isobe et al. ................... 348/135 |

FOREIGN PATENT DOCUMENTS

JP 2006-133515 5/2006

* cited by examiner

*Primary Examiner* — Michael Osinski
*Assistant Examiner* — Quan Pham
(74) *Attorney, Agent, or Firm* — Cowan, Liebowitz & Latman, P.C.

(57) ABSTRACT

The focus detection accuracy of a focus detection device that employs an external AF sensor unit having a pair of line sensors that are each comprised of multiple unit line sensors is improved. The individual line sensors are arranged so that the center of the field of view of an imaging optical system at a predetermined subject distance, at which field-of-view adjustment for causing the field of view of the imaging optical system and the field of view of a focus-detection optical system to match has been carried out, corresponds to the center of one of the multiple unit line sensors included in the individual line sensors.

6 Claims, 9 Drawing Sheets

WHEN F

WHEN M

WHEN N

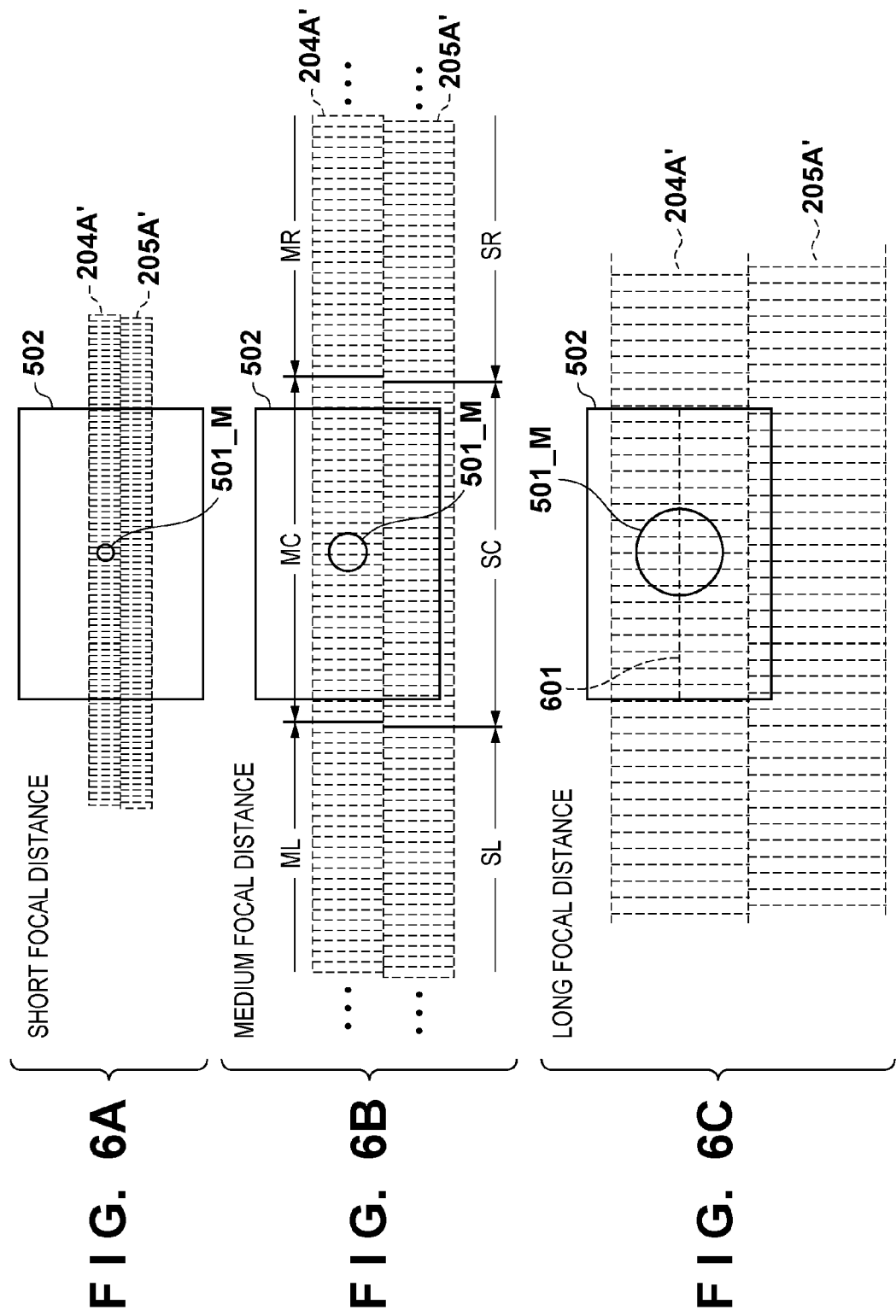
FIG. 6A SHORT FOCAL DISTANCE
FIG. 6B MEDIUM FOCAL DISTANCE
FIG. 6C LONG FOCAL DISTANCE

WHEN F

WHEN M

WHEN N

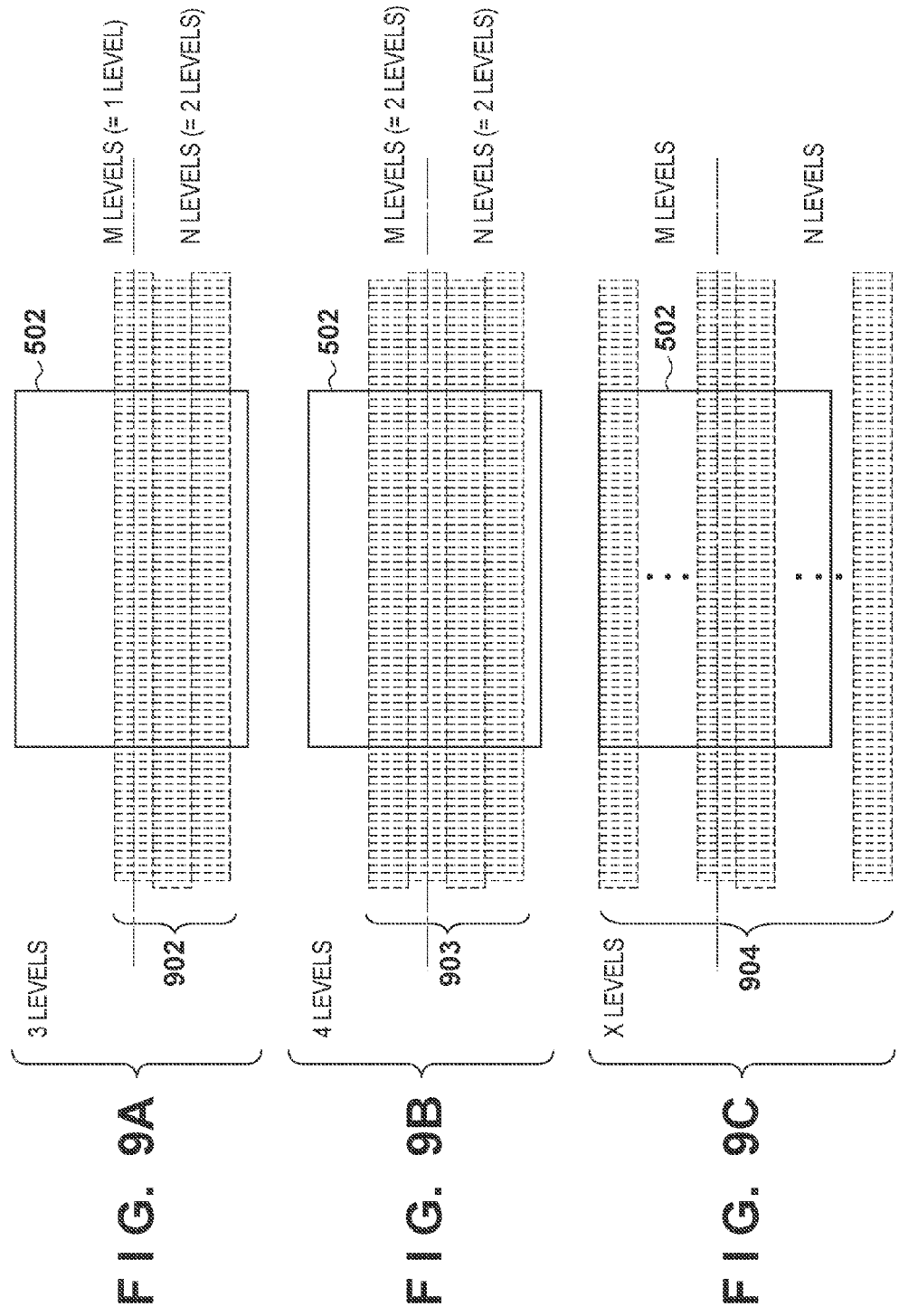

FOCUS DETECTION DEVICE AND IMAGE CAPTURING APPARATUS PROVIDED WITH THE SAME

BACKGROUND OF THE INVENTION

1. Field of the Invention

The present invention relates to focus detection devices and image capturing apparatuses provided with the same.

2. Description of the Related Art

At present, image capturing apparatuses such as still cameras, video cameras, and so on generally include auto focus detection (AF) functionality. The contrast detection method and the phase-difference detection method are widely used as auto focus detection methods. Of these, the phase-difference detection method detects the distance to a subject (or a defocus amount) based on the phase difference between signals obtained from a pair of line sensors, using the principle of triangulation. The position of a focus lens, which is included in an imaging lens, is controlled based on the results of the detection, thus making it possible to focus the imaging lens on the subject.

Two systems are known as specific configurations for realizing the phase-difference detection method; one, known as the TTL system, uses a line sensor to receive light that has entered into the imaging lens, whereas the other, known as the external AF system, uses a line sensor to receive light that has entered through a different path than the imaging lens. The former is capable of detecting a defocus amount based on the phase difference between output signals from the line sensors, whereas the latter is capable of detecting the distance to the subject.

Furthermore, in recent years, focus detection devices that use line sensors in which pixels are arranged in a staggered manner, so as to improve the accuracy of auto focus detection through the phase-difference detection method, are being put into practical use. This line sensor in which the pixels are arranged in a staggered manner has a configuration in which multiple unit line sensors are arranged adjacent to each in the direction orthogonal to the alignment direction of the pixels and so that the pixel positions are shifted by 0.5 pixels in the alignment direction. Japanese Patent Laid-Open No. 2006-133515 proposes improving focus detection accuracy by using a line sensor in which the pixels are arranged in a staggered manner and carrying out phase-difference detection using a combination of or individual image signals obtained from the unit line sensors.

Meanwhile, with the external AF system, the optical system that carries out focus detection (that is, the focus-detection optical system) is provided in a different position than the optical system in which is formed the image of the captured subject (that is, the imaging optical system), and thus parallax between the two arises, resulting in a mismatch between the image capturing area and the focus detection area. Due to this parallax, the region that can be used as a focus detection region in the field of view of the imaging optical system is limited. To reduce the influence of such parallax, parallax adjustment is carried out during the manufacture of the image capturing apparatus, where the center of the field of view of the imaging optical system is caused to correspond to the center of the field of view of the focus-detection optical system having assumed a subject at a predetermined distance. Focus detection through the external AF system on a subject within the field of view of the imaging optical system is realized through such parallax adjustment.

However, in the case where a line sensor in which pixels are arranged in a staggered manner is used in the external AF system, and parallax adjustment is carried out so that the centers of the fields of view of the imaging optical system and the focus-detection optical system correspond, there are situations in which the focus detection accuracy deteriorates due to the angle of view (when variable) of the imaging optical system, the subject distance, and so on.

For example, consider a line sensor in which two unit line sensors are arranged adjacent to each other in two rows. In this case, if the center of the field of view of the imaging optical system and the center of the field of view of the focus-detection optical system are caused to correspond, the center of the field of view of the focus-detection optical system falls upon the border between the two unit line sensors. Generally speaking, images are captured so that the main subject that is to be focused on is located in the center of the field of view, and thus if the center of the field of view of the imaging optical system falls upon the border between the unit line sensors, the light of the image of the main subject will be received having been split between the upper and lower unit line sensors. If the angle of view of the imaging optical system is narrowed, the number of pixels in the unit line sensors corresponding to the field of view of the imaging optical system drops, which makes it easier for the focus detection accuracy to deteriorate; meanwhile, if the image of the main subject is received being split between the upper and lower unit line sensors, it is easier for the focus detection accuracy to deteriorate as well.

SUMMARY OF THE INVENTION

Having been achieved in light of such conventional technical problems, the present invention improves the focus detection accuracy of a focus detection device that employs an external AF sensor unit having a pair of line sensors that are each comprised of multiple unit line sensors.

According to one aspect of the present invention, there is provided a focus detection device including a focus-detection optical system having an optical axis that is separate from an optical axis of an imaging optical system, the device comprising: a pair of line sensors, each having multiple pixels, for performing photoelectric conversion on a pair of subject images formed by a pair of imaging lenses that have mutually parallel optical axes and that are included in the focus-detection optical system; and a detection unit that detects the distance of a subject on which focus detection is to be carried out based on a phase difference between the signals of the subject images obtained by the photoelectric conversion performed by the pair of line sensors, wherein: each line sensor of the pair of line sensors is configured by arranging multiple unit line sensors, each having multiple pixels, so as to be adjacent to each other in the direction orthogonal to the alignment direction of the multiple pixels and so that the positions of the pixels between adjacent unit line sensors are shifted relative to each other; the field of view of the imaging optical system and the field of view of the focus-detection optical system are adjusted so as to correspond at a predetermined subject distance; and the pair of line sensors is arranged so that, in each line sensor of the pair of line sensors, the center of one of the multiple unit line sensors corresponds to the center of the field of view of the imaging optical system at the predetermined subject distance.

According to another aspect of the present invention, there is provided an image capturing apparatus comprising: the imaging optical system; the focus detection device according to the present invention; and a driving unit that drives a focus lens included in the imaging optical system based on a detection result obtained by the detection unit.

Further features of the present invention will become apparent from the following description of exemplary embodiments with reference to the attached drawings.

BRIEF DESCRIPTION OF THE DRAWINGS

FIGS. 6A through 6C are diagrams illustrating a relationship between the center of the field of view of the imaging optical system and the field of view of the focus-detection optical system in the case where the angle of view of the imaging optical system has changed when the line sensors have been arranged as illustrated in FIGS. 5A through 5C.

FIGS. 9A through 9C are diagrams illustrating the arrangement of line sensors 132 in the case where a line sensor 130 in an external AF sensor unit is comprised of three or more unit line sensors.

DESCRIPTION OF THE EMBODIMENTS

Figure 1:
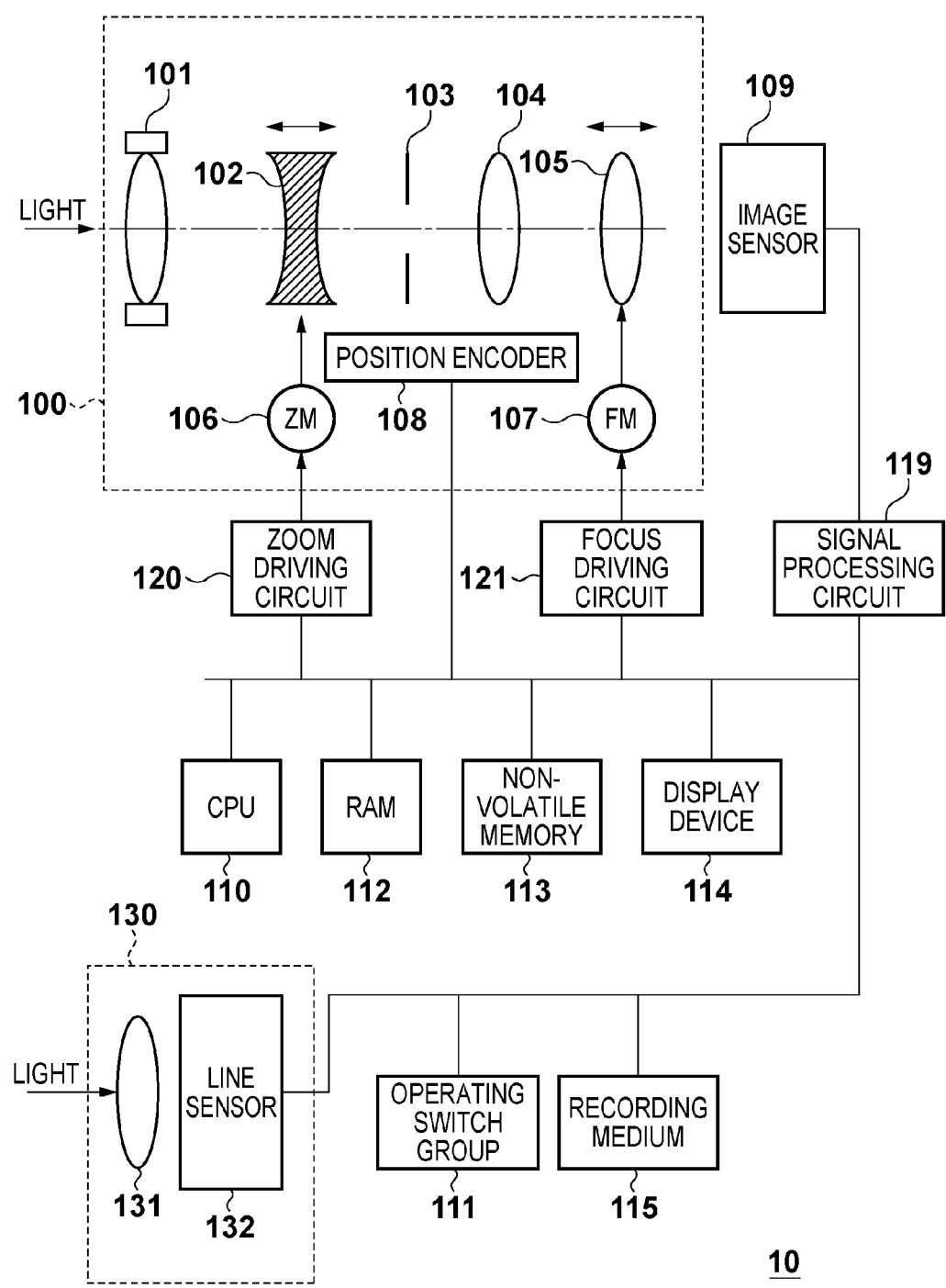
FIG. 1 is a block diagram illustrating an example of the configuration of a video camera serving as an example of an image capturing apparatus in which a focus detection device according to an embodiment of the present invention can be applied.

Exemplary embodiments of the present invention will now be described in detail in accordance with the accompanying drawings. FIG. 1 is a block diagram illustrating an example of the configuration of a digital video camera 10 serving as an example of an image capturing apparatus in which a focus detection device that employs the external AF system according to an embodiment of the present invention is applied.

A lens unit 100 configures an imaging optical system, in which are arranged, in order from the side on which the subject (light) is present, a fixed lens 101, a zoom lens 102, an aperture 103, a fixed lens 104, and a focus lens 105. Although these individual lenses are shown as single lenses in FIG. 1, it should be noted that the lenses may be comprised of multiple lenses as well.

A position encoder 108 detects the magnification of the zoom lens 102, the size of the aperture 103 (an aperture value), and the position of the focus lens 105.

The zoom lens 102 is driven in the optical axis direction by a zoom motor (ZM) 106, and the focus lens 105 is driven in the optical axis direction by a focus motor (FM) 107. The zoom motor 106 and the focus motor 107 operate upon receiving driving signals from a zoom driving circuit 120 and a focus driving circuit 121, respectively.

An image sensor 109 is, for example, a CCD image sensor, a CMOS image sensor, or the like. The image sensor 109 converts a subject image within an imaging range, formed by light that has entered into the lens unit 100, into electric signals corresponding to respective pixels using multiple photoelectric conversion elements. A signal processing circuit 119 carries out various types of signal processes, such as an A/D conversion process, an amplification process, a white balance process, a color interpolation process, a gamma correction process, and so on, on the electric signals output by the image sensor 109, thus generating image data in a predetermined format. The image data is output to a display device 114, or recorded into a recording medium 115 such as a semiconductor memory, an optical disk, a hard disk, or the like.

An operating switch group 111 is provided with a power switch, a switch for starting and stopping recording operations, playback operations, and so on, a switch for selecting an operating mode, a zoom switch for changing the zoom ratio (angle of view) of the lens unit 100, and so on. When the power switch is manipulated, a portion of programs that are stored in a non-volatile memory 113 is loaded into a RAM 112, and the operations of the various elements of the video camera are controlled by a CPU 110 executing the programs that have been loaded into the RAM 112. It is assumed that the video camera according to the present embodiment is capable not only of the external AF, but also of contrast AF, in which auto focus detection is carried out by finding the positions of peaks in the contrast of the image data in part (a focus detection area) of an image captured by the image sensor 109. With contrast AF, the in-focus position is found through what is known as "hill-climbing" control, in which a focus peak, where the contrast is at its highest, is found by repeatedly executing imaging and contrast detection based on the image data from the focus detection area while moving the focus lens by minute amounts.

An external AF sensor unit 130, which has a focus-detection optical system having an optical axis that is separate from that of the lens unit 100 (the imaging optical system), is provided in the digital video camera 10. Aside from intersecting at a subject distance set in advance through field-of-view adjustment, the optical axes of the lens unit 100 and the external AF sensor unit 130 do not overlap. The external AF sensor unit 130 includes an imaging lens 131, comprised of a pair of lenses whose optical axes are parallel (that is, the focus-detection optical system), and a line sensor 132 comprised of a pair of line sensors. The line sensor 132 is configured by arranging multiple light-receiving elements (pixels) in a row; the details thereof will be described later with reference to FIGS. 2A and 2B. Subject light enters into the line sensor 132 through the imaging lens 131, which has a fixed focal distance f (in other words, without passing through the lens unit 100, which serves as the imaging optical system). After the subject image has undergone photoelectric conversion in the line sensor 132, the resultant is converted into digital data by an A/D converter (not shown). The CPU 110 then calculates the subject distance, correlation amount, reliability level, and so on using the pair of digital data obtained from the pair of line sensors that configure the line sensor 132, through a known technique. Based on the results of these calculations, the CPU 110 provides the focus driving circuit 121 with a position to which the focus lens 105 is to be moved, and external AF is realized by controlling the position of the focus lens 105.

Next, an example of the configuration of the external AF sensor unit 130 will be described using FIGS. 2A and 2B.

Figure 2A:
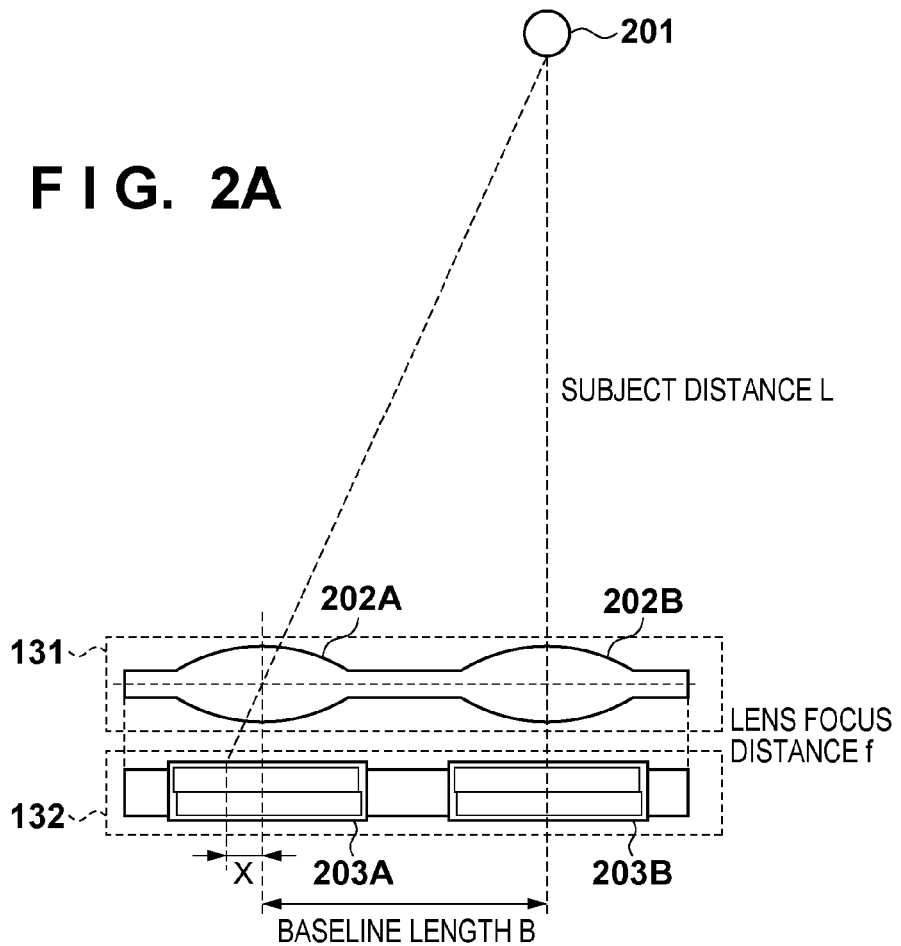
FIGS. 2A and 2B are diagrams illustrating an example of the configuration of an external AF sensor unit illustrated in FIG. 1.

In FIG. 2A, a subject 201 is, of subjects contained within an imaging range (subject field), the subject for which focus detection is to be carried out. The imaging lens 131 has a configuration in which first and second imaging lenses 202A and 202B, whose optical axes are parallel, are formed in an integral manner. Likewise, the line sensor 132 includes first and second line sensors 203A and 203B.

The subject image of the first imaging lens 202A is detected by the first line sensor 203A, which is one of the line sensors in the aforementioned pair, whereas the subject image of the second imaging lens 202B is detected by the second line sensor 203B, which is the other of the line sensors in the aforementioned pair. The first and second line sensors 203A and 203B perform photoelectric conversion on the individual subject images, and output electric signals corresponding to the luminances of the subject images. The electric signal output by the first line sensor 203A is referred to as an A image signal, whereas the electric signal output by the second line sensor 203B is referred to as a B image signal.

The first and second imaging lenses 202A and 202B and the first and second line sensors 203A and 203B are respectively positioned so as to be distanced from each other by a predetermined baseline length B. For this reason, it is possible to measure a subject distance L based on the principle of triangulation, using the A image signal and the B image signal obtained from the first and second line sensors 203A and 203B, respectively.

Figure 2B:
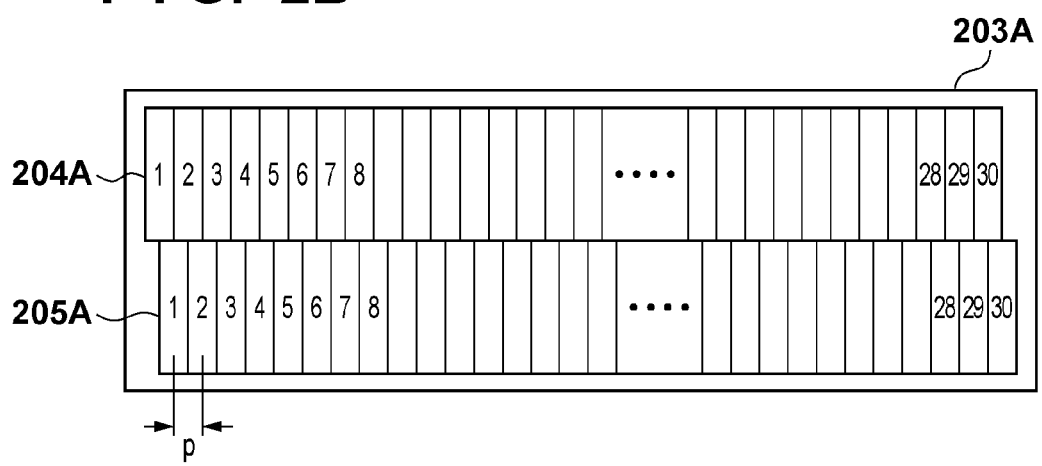

FIG. 2B is a diagram illustrating the first line sensor 203A in further detail. The first line sensor 203A has a configuration in which two unit line sensors 204A and 205A are arranged adjacent to each other, in the direction orthogonal to the alignment direction of the pixels (the vertical direction in FIG. 2B), so that the pixel positions in the alignment direction of the pixels are shifted by one half the pitch of the pixels. The unit line sensors 204A and 205A each have configurations in which 99 rectangular pixels are arranged in one direction at a pixel pitch p. The first line sensor 203A further includes a digital circuit (not shown) for controlling charge accumulation, and is configured so that when the accumulated charge amount in a single pixel reaches a predetermined value, the accumulation operations of the other pixels are stopped as well. Note that like the first line sensor 203A, the second line sensor 203B is comprised of two unit line sensors 204B and 205B.

Figure 3A:
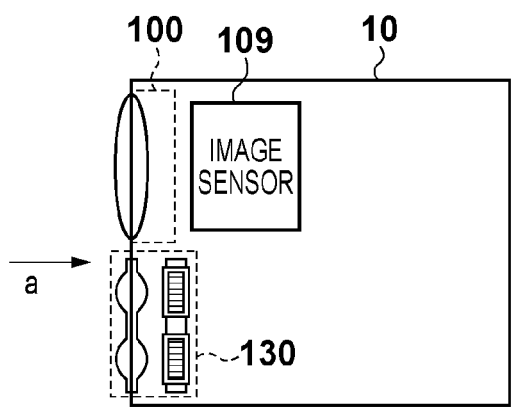
FIGS. 3A through 3D are diagrams illustrating examples of positional relationships between an imaging optical system and a focus-detection optical system according to an embodiment of the present invention.
Figure 3C:
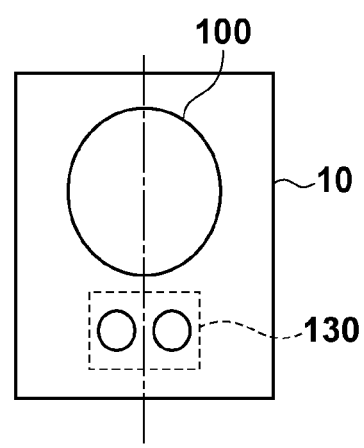
Figure 3B:
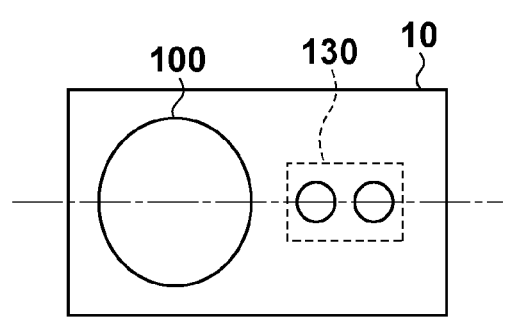
Figure 3D:
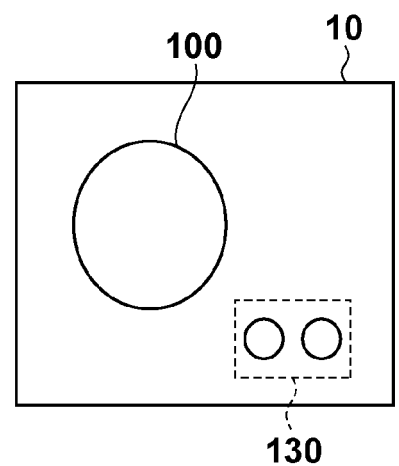

FIGS. 3A through 3D illustrate examples of positional relationships that can be implemented between the lens unit 100 and image sensor 109, and the external AF sensor unit 130, in the digital video camera 10 according to the present embodiment. FIG. 3A illustrates an example of the positional relationship between the housing of the digital video camera 10, and the lens unit 100 and external AF sensor unit 130. FIGS. 3B through 3D, meanwhile, illustrate examples of arrangement relationships between the lens unit 100 and the external AF sensor unit 130, when viewing the digital video camera 10 from the front (from the direction indicated by the arrow a). Specifically, FIG. 3B illustrates an example in which the arrangement is such that the optical axes of the lens unit 100 and the external AF sensor unit 130 fall upon a horizontal line. FIG. 3C, meanwhile, illustrates an example in which the external AF sensor unit 130 is arranged directly below the lens unit 100. FIG. 3D, on the other hand, illustrates an example in which the external AF sensor unit 130 is arranged below and to the side of the lens unit 100. In actuality, it is common to employ one of the examples illustrated in FIGS. 3B through 3D.

Figure 4A:
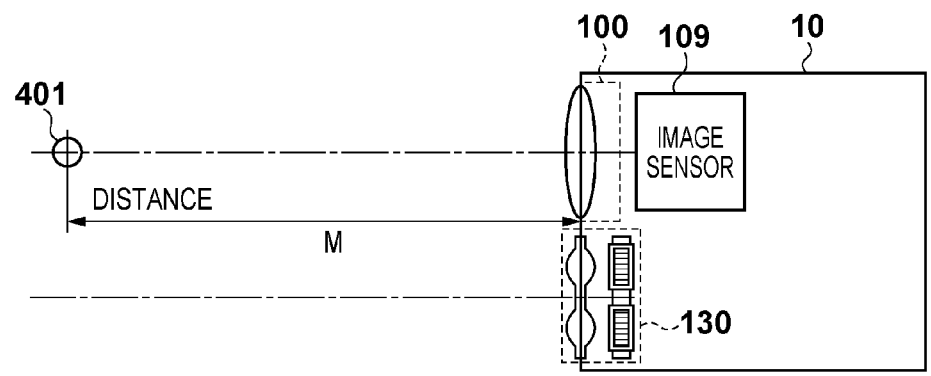
FIGS. 4A and 4B are diagrams illustrating a method for adjusting the fields of view of a focus-detection optical system and an imaging optical system according to an embodiment of the present invention.
Figure 4B:
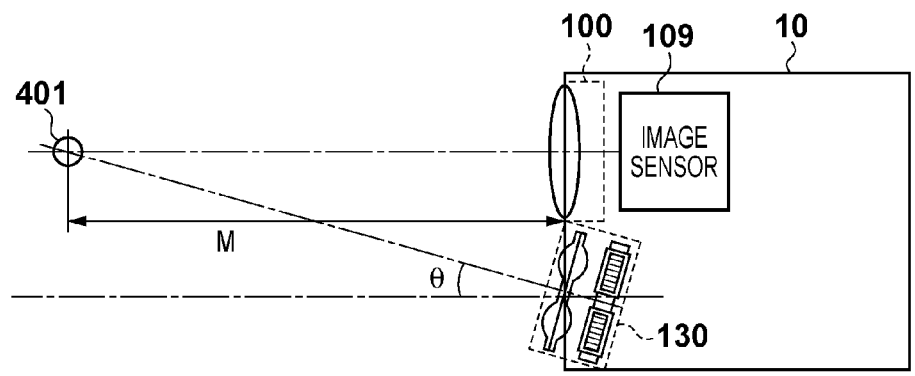

Next, a method for adjusting the fields of view of the focus-detection optical system (the imaging lens 131) and the imaging optical system (the lens unit 100) will be described with reference to FIGS. 4A and 4B. FIG. 4A illustrates an unadjusted state, in which the optical axes of both of the optical systems are parallel. Meanwhile, FIG. 4B illustrates a state in which field-of-view adjustment has been carried out based on an image signal of a subject 401 that is present in a position that is at a distance M. In this manner, the optical axis of the external AF sensor unit 130 is tilted by an angle θ so that the optical axis of the external AF sensor unit 130 crosses the optical axis of the lens unit 100 at the subject distance M. The field-of-view adjustment is carried out when the digital video camera 10 is manufactured, and the angle of the optical axis of the external AF sensor unit 130 is fixed.

Note that in order to simplify the descriptions, FIGS. 4A and 4B illustrate a case in which, as in FIG. 3B, 3C, and so on, it is sufficient to adjust the optical axis angle within a two-dimensional space. For example, as shown in FIG. 3D, there are cases where, when all of the optical axes are not aligned on a single line, the direction of the optical axis of the external AF sensor unit 130 is adjusted three-dimensionally. However, the following descriptions assume that the lens unit 100 and the external AF sensor unit 130 are arranged so that the optical axes are aligned on a horizontal line, as shown in FIG. 3B.

Next, using FIGS. 5A through 5C, the center of the field of view of the imaging optical system in the case where the subject distance has changed will be described along with an arrangement of the line sensors according to the present embodiment. Note that here, the angle of view of the imaging optical system (the lens unit 100) is assumed to be constant.

Figure 5A:
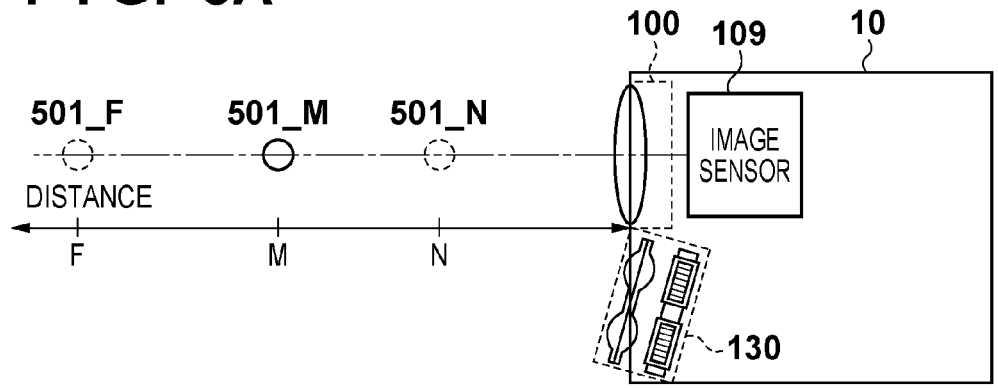
FIGS. 5A through 5D are diagrams illustrating the center of the field of view of an imaging optical system in the case where the distance to a subject has changed, along with an arrangement of line sensors, according to an embodiment of the present invention.

FIG. 5A illustrates the digital video camera 10 in a state in which field-of-view adjustment has been carried out using a subject 501_M at the distance M, as described with reference to FIGS. 4A and 4B, as a reference. Furthermore, FIG. 5A illustrates the same subject 501_F, 501_M, and 501_N represented by circles located at distances N, M, and F (where N<M<F) upon the optical axis of the lens unit 100.

First, because field-of-view adjustment is carried out for the subject distance M in the present embodiment, the center of the field of view of the imaging optical system and the arrangement of the line sensors according to the present embodiment will be described with reference to FIG. 5C, which illustrates the subject distance M.

Figure 5B:
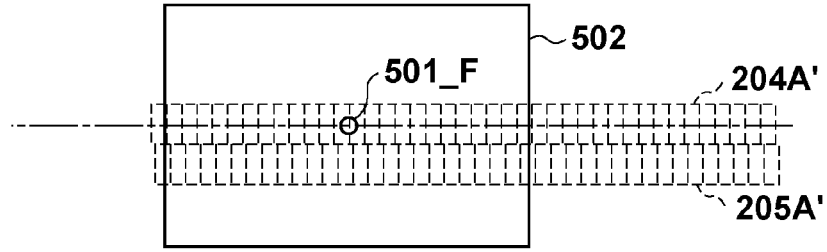
Figure 5C:
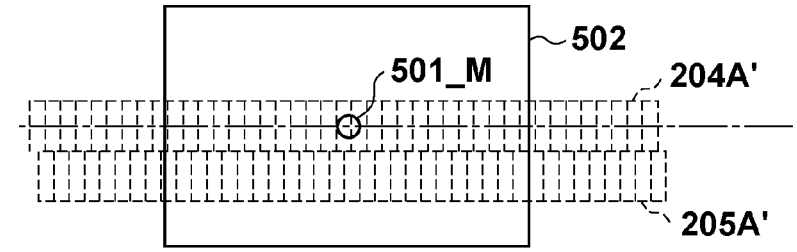

In FIG. 5C, the subject 501_M at the distance M can be seen in the center of a field of view 502 of the lens unit 100, which serves as the imaging optical system. Meanwhile, in the field of view of the focus-detection optical system, fields of view 204A' and 205A' of the unit line sensors 204A and 205A, respectively, are indicated by dotted lines.

Field-of-view adjustment is carried out so that at the subject distance (the distance M), the center of the field of view of the imaging optical system corresponds to the center of the field of view of the focus-detection optical system. At this time, as shown in FIG. 5C, the line sensors 203A and 203B are arranged so that the center of the field of view of the imaging optical system corresponds to the center of the field of view of the upper unit line sensor 204A (204B) in the line sensor 203A (203B). Through this, the fields of view 205A' and 205B' of the lower unit line sensor 205A (205B) in the line sensor 203A (203B) are positioned lower than the center of the field of view of the imaging optical system.

Figure 5D:
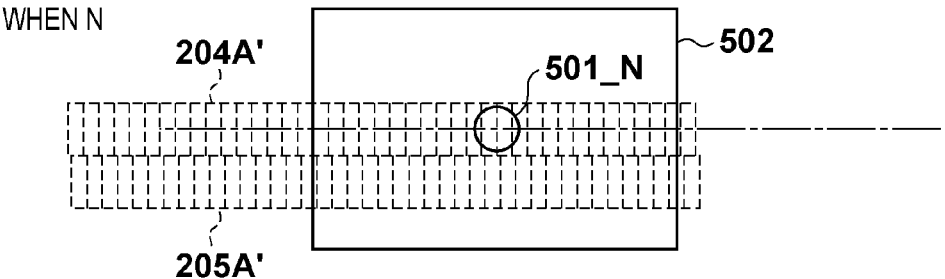

Relationships between the field of view of the imaging optical system and the field of view of the focus-detection optical system when the subject distance has become F and N in a state in which the line sensors 203A and 203B are arranged in this manner are illustrated in FIGS. 5B and 5D. As shown in FIG. 5B, when the subject distance is greater than the distance for which the field-of-view adjustment was carried out, the position of the subject within the field of view 502 of the imaging optical system is the same (because it is located on the optical axis of the lens unit 100), although the subject does appear smaller than the subject 501_M due to the angle of view of the imaging optical system being constant. However, the position of the subject in the field of view of the focus-detection optical system moves to the left in the horizontal direction.

Likewise, as shown in FIG. 5D, when the subject distance is less than the distance for which the field-of-view adjustment was carried out, the position of the subject within the field of view 502 of the imaging optical system is the same, although the subject does appear larger than the subject 501_M because the angle of view of the imaging optical system is constant. However, the position of the subject in the field of view of the focus-detection optical system moves to the right in the horizontal direction.

In this manner, in the case where the lens unit 100 and the external AF sensor unit 130 are arranged so that the optical axes are aligned on a horizontal line, the position of the subject in the field of view of the focus-detection optical system moves in the horizontal direction due to the change in the subject distance.

Next, using FIGS. 6A through 6C, a relationship between the centers of the field of view of the imaging optical system and the field of view of the focus-detection optical system will be described, assuming a case where the angle of view of the imaging optical system (that is, the focal distance) has changed when field-of-view adjustment as described using FIG. 5C has been carried out. Here, it is assumed that the subject distance is constant (M). Furthermore, the same reference numerals are assigned to the same elements from FIGS. 5A through 5C.

Relationships between the field of view of the imaging optical system and the field of view of the focus-detection optical system in the case where the focal distance of the imaging optical system (the lens unit 100) has been changed from shorter (wide-angle) to longer (telephoto) in the order of A, B, and C are illustrated.

As shown in FIGS. 6A through 6C, the position of the subject 501_M in the field of view 502 of the imaging optical system does not change. Likewise, the position of the subject 501_M in the field of view of the focus-detection optical system also does not change.

However, the relationship between the size of the field of view 502 of the imaging optical system and the size of the field of view of the focus-detection optical system changes drastically. In particular, as shown in FIG. 6C, the percentage of the field of view of the imaging optical system that falls within the field of view of the focus-detection optical system drops as the focal distance of the imaging optical system increases (that is, as the field of view narrows). Although specific focal distances that correspond to FIGS. 6A through 6C are not mentioned here, it should be noted that the phenomenon illustrated in FIGS. 6A through 6C basically occurs no matter what the specific focal distances are.

With the conventional field-of-view adjustment method (or line sensor arrangement method), the position indicated by the dotted line 601 in FIG. 6C corresponds to the border between the unit line sensors (and the fields of view thereof), and thus parts of the image of the subject 501_M are separately detected by the upper and lower unit line sensors, making it difficult to obtain a clear image signal.

However, as described thus far, in the present embodiment, the line sensors are arranged so that the centers of the unit line sensors 203A and 203B correspond with the center of the field of view of the imaging optical system when the center of the field of view of the focus-detection optical system and the center of the field of view of the imaging optical system are caused to correspond. For this reason, more light from the image of a subject present in the center of the field of view of the imaging optical system can be received by a single unit line sensor, not only when the angle of view of the imaging optical system does not changed but also when the angle of view has changed, which makes it possible to improve the quality of the image signal used in the focus detection.

In particular, when the angle of view of the imaging optical system narrows, the number of pixels in the line sensor that correspond to the field of view of the imaging optical system drops; therefore, obtaining a high-quality image signal is important in order to obtain accurate focus detection results. In this respect, the configuration according to the present embodiment is advantageous.

Figure 7:
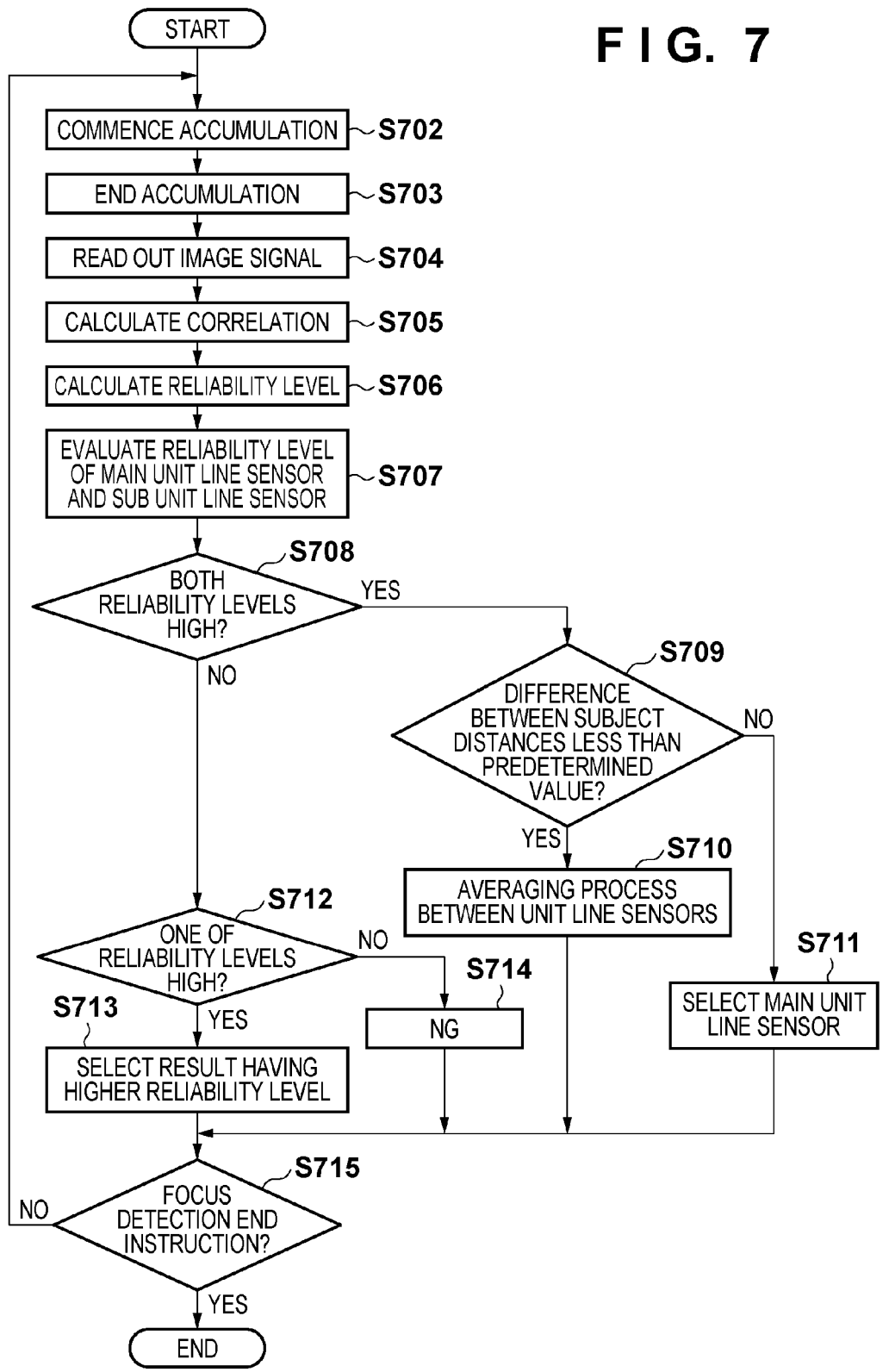
FIG. 7 is a flowchart illustrating focus detection operations performed by an external AF sensor unit 130 according to an embodiment of the present invention.

Next, focus detection operations performed by the external AF sensor unit 130 according to the present embodiment will be described using the flowchart in FIG. 7.

The focus detection operations commence when a predetermined state has been reached, such as when the digital video camera 10 has been turned on and enters a recording standby state.

In S702, the CPU 110 instructs the external AF sensor unit 130 to commence accumulation, and charge accumulation by the line sensor 132 is commenced as a result. When the accumulated charge amount (voltage) in any of the pixels has reached a predetermined value, the charge accumulation operations for all of the pixels is automatically stopped by the control circuit in the external AF sensor unit 130 (S703). Here, the "predetermined value" is set to a given value that is close to the saturation charge amount.

In S704, the CPU 110 carries out A/D conversion on the charge amounts in the respective pixels that have been accumulated by the line sensor 132, and the A image signal and the B image signal, which correspond to subject luminances, are obtained as a result. Because the line sensors 203A and 203B are comprised of two unit line sensors that have 99 pixels in the present embodiment, 396 pixels' worth of pixel data is read out in S704.

In S705, the CPU 110 divides the A image signal and the B image signal into six areas, where a signal segment made up of 33 sequential pixels is taken as a single area, and calculates correlations between the A image signal and the B image signal for each area that corresponds between the two image signals. The CPU 110 calculates, for each of the corresponding areas, a shift amount (phase difference) at which the A image signal and the B image signal of that area match the closest, and calculates the subject distance based on the principle of triangulation. This calculation can be carried out using a known method, and thus details thereof will be omitted.

Here, of the two unit line sensors arranged vertically adjacent to each other, the one unit line sensor 204A or 204B that is arranged so that its center corresponds to the center of the field of view of the imaging optical system is called a main unit line sensor, whereas the other unit line sensor is called a sub unit line sensor.

Meanwhile, the areas obtained by dividing the 99 pixels in the main unit line sensor into three sections of 33 sequential pixels are, from the left, called an ML area, an MC area, and an MR area, respectively, and the areas in the sub unit line sensor that correspond thereto are called an SL area, an SC area, and an SR area (see FIG. 6B).

In S705, the CPU 110 calculates the subject distance for each area by individually calculating the phase differences between the A image signal and the B image signal for each of the six areas. In S706, the CPU 110 calculates the certainty of the phase differences (subject distances) calculated for each of the areas, or in other words, calculates a reliability level, based on the degree to which the A image signal and the B image signal match. Although the degree of matching may be calculated in any manner, it can be thought that the degree of matching will be higher, for example, the lower the difference between the image signals is after the detected phase differences have been applied.

In S707, the CPU 110 evaluates the reliability levels calculated in S706, for each of the corresponding areas between the main unit line sensor and the sub unit line sensor. In the case where both of the reliability levels of the phase differences calculated for the corresponding areas (for example, the ML area and the SL area) are high (S708, Y), the CPU 110 furthermore determines whether or not the difference between the phase differences (or between the corresponding subject distances) is less than a predetermined value (S709). If it is determined that both of the conditions are met, the CPU 110 advances the processing to S710, where a value obtained by averaging the calculation results obtained from the corresponding areas (the ML area and the SL area) is taken as the focus detection result for the area L.

However, in the case where both of the reliability levels for the phase differences calculated in the corresponding areas are high (S708, Y) but the difference between the respective phase differences (or between the corresponding subject distances) is greater than or equal to the predetermined value (S709, N), the CPU 110 advances the processing the step S711. Then, in S711, the CPU 110 takes the calculation result obtained from the main unit line sensor (the ML area) as the focus detection result for the area L.

Furthermore, in the case where only one of the reliability levels of the phase differences calculated for the corresponding areas (for example, the ML area and the SL area) is high (S708, N and S712, Y), the CPU 110 takes the calculation result obtained from the area that has a high reliability level as the focus detection result for the area L (S713).

Finally, in the case where neither of the reliability levels of the phase differences calculated for the corresponding areas (for example, the ML area and the SL area) is high (S712, N), the CPU 110 determines that a focus detection result has not been obtained for the area L (S714).

In the same manner, the MC area and the SC area are compared, the MR area and the SR area are compared, and distance measurement results are obtained through the respective comparisons.

If a focus detection end instruction has been detected in S715, the CPU 110 ends the focus detection process, whereas if the focus detection end instruction has not been detected, the CPU 110 returns the process to S702 and repeats the processing that has been described thus far.

Note that in the present embodiment, the unit line sensors are divided into three areas, indicated by L, C, and R, and the final focus detection results of the respective areas are obtained from the focus detection results calculated for the areas that correspond between the unit line sensors. However, a reduction in the processing time, the power consumption, and so on may be sought by carrying out the focus detection process on only four areas, or the ML area, the MC area, the MR area, and the SC area, or on only two areas, or the MC area and the SC area.

Meanwhile, in the case where each line sensor is to be comprised of three or more unit line sensors, there are many combinations of unit line sensors that are adjacent to each other vertically, but the present embodiment can comply with a configuration that employs any number of unit line sensors by sequentially executing the aforementioned processing on groups of two adjacent unit line sensors. Note that in this case, for processes carried out between sub unit line sensors, the sub unit line sensor that is closer to the main unit line sensor may be employed as a main unit line sensor.

Figure 8A:
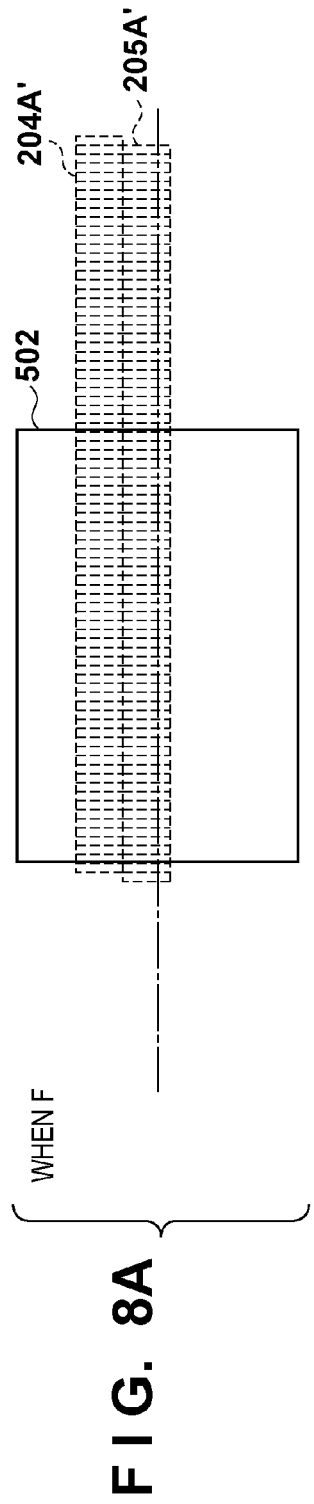
FIGS. 8A through 8C are diagrams illustrating positional relationships between the field of view of an imaging optical system and the field of view of a focus-detection optical system based on the distance to a subject, in the case where the arrangement of line sensors according to an embodiment of the present invention is applied in an external AF sensor unit having the positional relationship with respect to an imaging optical system indicated in FIG. 3D.
Figure 8B:
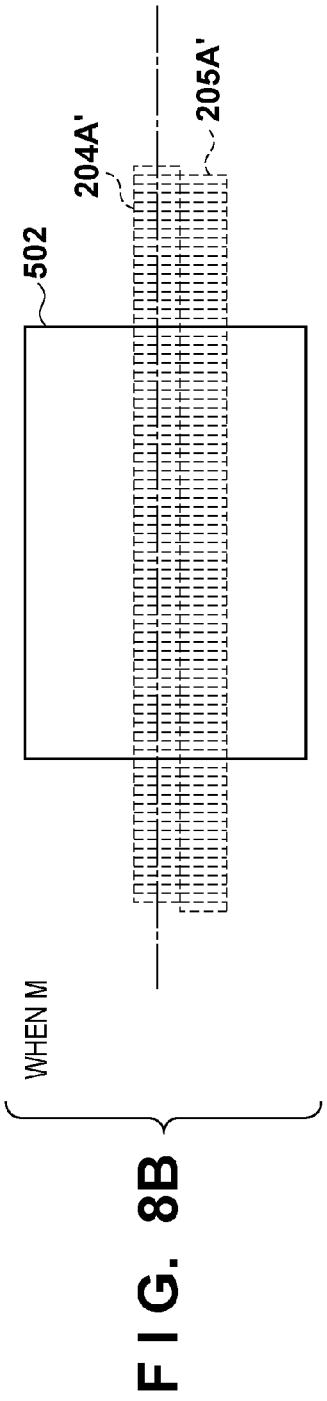
Figure 8C:
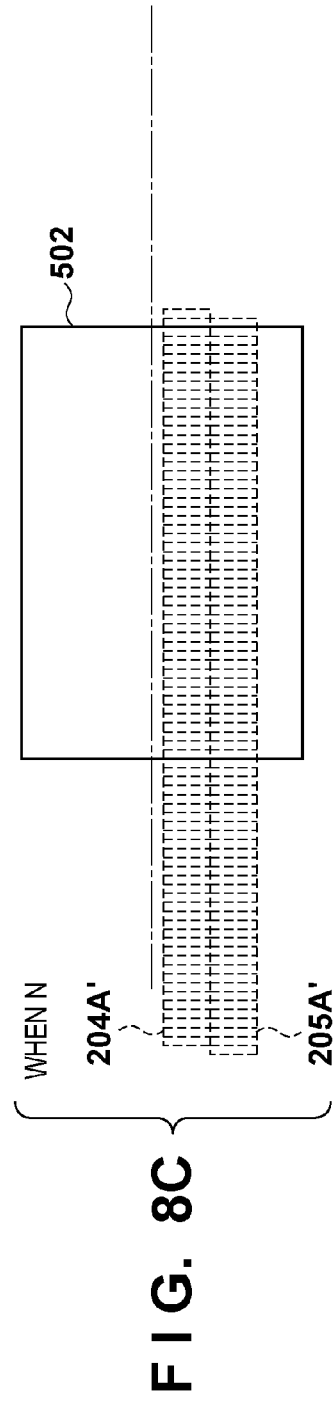

FIGS. 8A through 8C illustrate a positional relationship between the fields of view of the imaging optical system and the focus-detection optical system based on the subject distance, in the case where the line sensor arrangement according to the present embodiment has been applied in the digital video camera 10 in which the lens unit 100 and the external AF sensor unit 130 have the arrangement relationship illustrated in FIG. 3D. As with FIGS. 5B through 5D, FIGS. 8A through 8C assume that the angle of view of the imaging optical system (the lens unit 100) is constant, and illustrate relationships between the field of view of the imaging optical system when the subject distance is F, M, and N, and the fields of view 204A' and 205A' of the unit line sensors.

In this example, the optical axis of the lens unit 100 and the optical axis of the external AF sensor unit 130 are shifted in the diagonal direction, as shown in FIG. 3D. For this reason, in response to changes in the subject distance, the center of the field of view of the imaging optical system moves not only in the horizontal direction relative to the field of view of the focus-detection optical system, as shown in FIGS. 5B through 5D, but also in the vertical direction.

In other words, in the case where the distance is F, which is farther than the subject distance M, when focus adjustment is carried out, the center of the field of view of the imaging optical system moves diagonally to the lower-left (FIG. 8A). Meanwhile, in the case where the distance is N, which is closer than the subject distance M, when focus adjustment is carried out, the center of the field of view of the imaging optical system moves diagonally to the upper-right (FIG. 8C). Generally speaking, it is often the case that the subject distance is short when capturing images of people. Furthermore, it is often the case that the subject is a person, and in such a case, it is furthermore often the case that the person's face is located near the center of the field of view of the imaging optical system and the person's body is positioned therebelow. For this reason, in the case where the subject distance is short, the center of the field of view of the focus-detection optical system is to be corresponded to the center of the field of view of the imaging optical system or somewhat therebelow. The field-of-view adjustment method according to the present embodiment meets these conditions. Meanwhile, as shown in FIGS. 6A through 6C, in the case where the angle of view changes, it is possible to suppress deterioration in the focus detection accuracy when the angle of view has narrowed.

FIGS. 9A through 9C are diagrams illustrating, as an example in which the present embodiment has been applied, the arrangement of line sensors in the case where the line sensor 132 in the external AF sensor unit 130 is comprised of three or more unit line sensors.

FIG. 9A illustrates an example in which the line sensor is comprised of three unit line sensors, FIG. 9B, four unit line sensors, and FIG. 9C, X (where X is an integer greater than 4)

unit line sensors; these drawings illustrate positional relationships of the center of the field of view of the imaging optical system after field-of-view adjustment has been carried out.

902 through 904 illustrate the fields of view of the respective line sensors. Meanwhile, based on a horizontal line that passes through the center of the field of view of the imaging optical system (the lens unit 100), the number of unit line sensors in which at least part corresponds to the upper half of the field of view of the imaging optical system is taken as M, whereas the number of unit line sensors in which at least part corresponds to the lower half of the field of view of the imaging optical system is taken as N.

When there are three or more unit line sensors, setting M−1 to be less than or equal to N and arranging the line sensors so that the center of the field of view of the imaging optical system after the field-of-view adjustment corresponds to the center of any of the unit line sensors makes it possible to achieve the effects described above. FIGS. 9A through 9C illustrate examples in which, of the M unit line sensors, the arrangement is such that the center of the unit line sensor at the lowermost line corresponds to the center of the field of view of the imaging optical system after the field-of-view adjustment has been carried out.

As described thus far, according to the present embodiment, the line sensors are arranged so that the center of the field of view of the imaging optical system at a predetermined subject distance on which field-of-view adjustment has been carried out corresponds to the center of one of multiple unit line sensors that configure the line sensor included in the imaging optical system. Through this, it is possible to improve the focus detection accuracy, the focusing speed, and so on of an external AF that uses a line sensor in which multiple unit line sensors, each having multiple pixels, are arranged so as to be adjacent to each other in the direction orthogonal to the alignment direction of the pixels and so that the pixel positions between adjacent unit line sensors are shifted.

Furthermore, if the line sensors are arranged so that the center of a unit line sensor that is at least partially present in the upper half of the field of view of the imaging optical system corresponds to the center of the field of view of the imaging optical system, stable focus detection can be carried out even for subjects that are closer than the subject distance on which the field-of-view adjustment was carried out. This is particularly advantageous in the case where the main subject is present in a range from the center to the lower portion of the field of view of the imaging optical system, as when capturing images of people and so on.

In addition, in the case where field-of-view adjustment has been carried out for a short subject distance, the entire field of view of the focus-detection optical system moves toward the center of the field of view of the imaging optical system for subjects that are further from the subject distance for which the field-of-view adjustment has been carried out, which makes it possible to perform the appropriate focus detection for the center of the field of view of the imaging optical system.

Other Embodiments

The aforementioned embodiment describes arranging the line sensors so that the center of the field of view of the imaging optical system corresponds to the center of one of the unit line sensors in the focus-detection optical system when the field-of-view adjustment is carried out for the imaging optical system and the focus-detection optical system at a predetermined subject distance. However, in the present invention, it is not necessary for both of these to completely correspond, and the effects of the invention can still be achieved as long as the centers generally correspond. Therefore, it should be noted that in the present specification and the appended claims, the centers "corresponding" is not to be interpreted as being limited to perfect correspondence.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-291127, filed on Dec. 27, 2010, which is hereby incorporated by reference herein its entirety.

What is claimed is:

1. A focus detection device including a focus-detection optical system having optical axes that are separate from an optical axis of an imaging optical system, the device comprising:

a plurality of pairs of line sensors including a first pair of line sensors and a second pair of line sensors, each line sensor having multiple pixels, wherein the first pair of line sensors and the second pair of line sensors are arranged in parallel, and wherein the first pair of line sensors and the second pair of line sensors corresponds to a same focus detection area; and a detection unit that detects the distance of a subject on which focus detection is to be carried out based on a phase difference between the signals of the subject images obtained by the photoelectric conversion performed by the first pair of line sensors and the second pair of line sensors, wherein:

the first pair of line sensors and the second pair of line sensors are adjacently arranged in the direction orthogonal to the alignment direction of the multiple pixels so that a field of view of each line sensor of the first pair of line sensors includes the center of the field of view of the imaging optical system and that a field of view of each line sensor of the second pair of line sensors does not include the center of the field of view of the imaging optical system, the first pair of line sensors are arranged at the top of the plurality pairs of line sensors in the direction orthogonal to the alignment direction of the multiple pixels, and wherein the first pair of line sensors and the second pair of line sensors are arranged so that, regardless of change of focus length occurring within the imaging optical system, a field of view of each line sensor of the first pair of line sensors includes the center of the field of view of the imaging optical system and a field of view of each line sensor of the second pair of line sensors does not include the center of the field of view of the imaging optical system.

2. The focus detection device according to claim 1, wherein the plurality of pairs of line sensors comprises one or more pair of line sensors other than the first and second pairs of line sensors, each of which is arranged in a similar manner as the second pair of line sensors, wherein line sensors arranged to be adjacent to each other in the direction orthogonal to the alignment direction of the multiple pixels are also arranged so that when the number of line sensors that are at least partially within the upper half of the field of view of the imaging optical system is taken as M and the number of unit line sensors that are at least partially within the lower half of the field of view of the imaging optical system is taken as N, M−1 is less than or equal to N, and so that the center of the line sensor on the lowermost line in the line sensors that are at least partially within the upper half of the field of view of the imaging optical system corresponds to the center of the field of view of the imaging optical system at the predetermined subject distance.

3. The focus detection device according to claim 1, wherein in the case where a difference between subject distances, obtained from phase differences of the signals of the subject images obtained through the photoelectric conversion performed by one of the first and second pair of line sensors, is greater than or equal to a predetermined value, the detection unit takes, as a detection result, a subject distance obtained from the phase difference between the signals of the subject images obtained through the photoelectric conversion performed by the first pair of line sensors.

4. An image capturing apparatus comprising:
the imaging optical system;
the focus detection device according to claim 1; and
a driving unit that drives a focus lens included in the imaging optical system based on a detection result obtained by the detection unit.

5. The focus detection device according to claim 1, wherein:
each of the line sensors has multiple pixels;
one of line sensors in the first pair of line sensors and one of line sensors in the second pair of line sensors are arranged so as to be adjacent to each other in the direction orthogonal to the alignment direction of the multiple pixels; and
the other of line sensors in the first pair of line sensors and the other of line sensors in the second pair of line sensors are arranged so as to be adjacent to each other in the direction orthogonal to the alignment direction of the multiple pixels.

6. The focus detection device according to claim 1, each of line sensors arranged to be adjacent to each other in the direction orthogonal to the alignment direction of the multiple pixels, are further arranged so that the positions of the pixels between the adjacent line sensors are shifted relative to each other.

* * * * *